(12) United States Patent
Gray

(10) Patent No.: US 7,946,519 B2
(45) Date of Patent: May 24, 2011

(54) PRETENSIONED RETRACTOR

(75) Inventor: Mark F. Gray, Sterling Heights, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 12/385,148

(22) Filed: Mar. 31, 2009

(65) Prior Publication Data

US 2010/0116921 A1    May 13, 2010

Related U.S. Application Data

(60) Provisional application No. 61/193,253, filed on Nov. 12, 2008.

(51) Int. Cl.
*B65H 75/48* (2006.01)
(52) U.S. Cl. .......... 242/374; 242/379.1; 280/806; 297/478
(58) Field of Classification Search .......... 242/374, 242/379.1, 382.2; 280/806; 297/478
See application file for complete search history.

(56) References Cited

U.S. PATENT DOCUMENTS

| | | | | |
|---|---|---|---|---|
| 5,526,996 | A * | 6/1996 | Ebner et al. | 242/374 |
| 6,105,893 | A * | 8/2000 | Schmidt et al. | 242/374 |
| 6,405,959 | B1 * | 6/2002 | Klingauf et al. | 242/374 |
| 6,443,380 | B1 * | 9/2002 | Biller et al. | 242/374 |
| 6,616,081 | B1 * | 9/2003 | Clute et al. | 242/379.1 |
| 6,969,089 | B2 * | 11/2005 | Klingauf et al. | 280/805 |
| 7,290,730 | B2 | 11/2007 | Nagata et al. | |
| 7,690,688 | B2 * | 4/2010 | Clute | 280/806 |
| 2006/0208475 | A1* | 9/2006 | Kitazawa et al. | 280/806 |
| 2007/0145174 | A1* | 6/2007 | Takamatsu et al. | 242/374 |
| 2008/0087754 | A1* | 4/2008 | Aihara et al. | 242/374 |

* cited by examiner

*Primary Examiner* — Sang Kim
(74) *Attorney, Agent, or Firm* — Foley & Lardner LLP

(57) ABSTRACT

Seat belt retractors for spooling seat belts (webbings) include multiple independent torque transmission or absorbing systems. The seatbelt retractor comprises a webbing, a spool, a pinion, a pretensioner, at least one coupler pawl, and a locking mechanism including a lock base and a lock pawl. The at least one coupler pawl is positioned in a cavity in the spool. During a predetermined low acceleration event, the at least one coupler pawl pivots so that a portion of the at least one coupler pawl leaves the cavity and engages the lock base to load the lock base which is then prevented from rotating in a spool extracting direction by the locking pawl. When the pretensioner activates during a predetermined higher acceleration event, the pretensioner rotates the pinion in the webbing retraction direction to rotate the spool in the webbing retraction direction.

16 Claims, 10 Drawing Sheets

PRETENSIONED RETRACTOR

CROSS-REFERENCE TO RELATED PATENT APPLICATIONS

This application claims priority to U.S. Provisional Patent Application No. 61/193,253, filed Nov. 12, 2008, which is incorporated herein by reference in its entirety.

BACKGROUND

The present disclosure relates generally to the field of seat belt retractors for spooling seat belt (webbings) for restraining an occupant of a seat system of vehicles and the like. More specifically, this disclosure relates to a retractor having multiple independent torque transmission or absorbing systems.

A seatbelt device for use within a vehicle provides safety to an occupant by restraining the movement of the occupant during a sudden acceleration, typically resulting from a dynamic impact event of the vehicle. A typical seatbelt device includes a webbing or belt, a buckle, a tongue member to engage the buckle, a retractor, and an anchor member. Retractors include a spool and through the use of a force, often generated by a spring, wind the webbing around the spool. During a dynamic impact event of the vehicle, the retractor locks the webbing from extracting or unwinding, which restricts movement of the occupant.

It has been known to construct a retractor which includes a pretensioner and a locking mechanism. The pretensioner includes an explosive charge that rapidly generates gas during a vehicle dynamic event to create pressure to move a piston that may drive a rack, ball bearings, or any other member that may be coupled to a pinion gear through a teeth mesh. The pinion may be coupled directly or indirectly, through a member or hub, to a torsion shaft coupled to the spool, whereby rotation of the pinion transmits torque through the torsion shaft into the spool, creating torque to retract the webbing. This pretension applied to the seatbelt removes the slack between the webbing and the occupant, therefore reducing the movement that the occupant may be undergo during the dynamic impact event. The pretensioner may be deployed when sensors on the vehicle detect an impact event and are typically designed to deploy at high speed impacts. The locking mechanism may include a locking pawl driven by a force, from a spring or inertia, and having teeth to mesh with teeth of the frame member under low speed impacts, thus preventing the rotation of the spool and preventing the seatbelt from extracting. A locking pawl may be coupled to the torsion bar indirectly through other members. The torsion bar is designed to deform torsionally when subjected to a predetermined torque to absorb energy during loading, imparted by the mass of an occupant during acceleration of the vehicle, to reduce the restraint force exerted on the occupant during the dynamic impact event, thereby providing improved safety to the occupant.

When traditional retractors have a pretensioner and a spool dependently coupled, the automatic locking retractor (ALR) zone may shift due to yielding of the torsion bar from the high torque resulting from the acceleration of the occupant during a low speed dynamic impact event, when the pretensioner does not fire. This results in the ALR zone being no longer useable. This ALR zone shift may prohibit the locking mechanism from locking the retractor, allowing for extraction of the belt webbing, which reduces the ability of the seat belt system to restrain a child seat or an occupant. Additionally, the spool of these traditional retractors remains coupled to the pretensioner following deployment. This coupling creates an undesirable effect of having a delay or variable performance of energy management of the seat belt system, since to transmit torque through the torsion bar, the torque induced from restraining the occupant must overcome the energy (i.e., the torque) of the pretensioner.

Accordingly, an object of the present disclosure is to provide a cost effective retractor mechanism which includes a pretensioner and locking mechanism that are independently coupled to eliminate ALR zone shifting and additionally provide efficient energy management of the seat belt system.

SUMMARY

One exemplary embodiment relates to a seatbelt retractor for a seat belt device in a vehicle. The retractor comprises a frame and a spool configured to be fixed to one end of a webbing so that the webbing may be wound around the spool. The spool is rotatably mounted at both ends to the frame and is configured to rotate in a webbing extraction direction and a webbing retraction direction. The retractor further comprises a torsion bar positioned in the spool. A first end of the torsion bar is coupled to a torsion bar cam and a second end of the torsion bar is connected to a pinion. The torsion bar cam is configured to engage the spool. The retractor further comprises a pretensioner coupled to the second end of the torsion bar via the pinion. The pretensioner is configured to rotate the pinion in a webbing retraction direction when the pretensioner activates in response to an acceleration of the vehicle greater than a predetermined high acceleration. The retractor also comprises at least one coupler pawl positioned in a cavity in the spool and connecting the spool to a locking mechanism to prevent rotation of the spool in response to an acceleration of the vehicle greater than a low acceleration, but less than the predetermined high acceleration. The locking mechanism is configured to prevent rotation of the spool. The at least one coupler pawl is configured to pivot so that when the vehicle acceleration exceeds the predetermined high acceleration and the pretensioner is activated, the spool is not connected to the locking mechanism thereby allowing the spool to rotate relative to the locking mechanism.

It is to be understood that both the foregoing general description and the following detailed description are exemplary and explanatory only, and are not restrictive of the invention as claimed.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

According to one embodiment of the disclosure, the retractor comprises two independent mechanisms to transfer or absorb torque. For a low acceleration event, the torque is absorbed to prohibit extraction of the webbing to mitigate the movement of the occupant to improve safety. Webbing extraction is prohibited by locking rotation of the spool in the extraction direction by loading at least one coupler pawl between a spool and a locking mechanism. The locking mechanism includes a lock base, which contacts the coupler pawls, and a locking pawl, having teeth that engage teeth of the frame, thus preventing rotation of the locking mechanism. For a high acceleration event, a torque is generated by a pretensioner to retract the webbing of the seat belt system to remove clearance between the webbing and the occupant to mitigate movement of the occupant to improve safety. The pretensioner may be pivotally coupled to a pinion and thereby rotates the pinion (in the webbing retraction direction), which is also pivotally coupled to a torsion bar thereby transferring rotation to the torsion bar. The torsion bar is also pivotally coupled, thereby transferring the torque, to a torsion bar cam, which contacts the coupler pawls, which also contact the spool, prohibiting rotation of the spool in the webbing extraction direction. The pretensioner is non-reversible, so after firing it is prevented from rotating in the webbing extraction direction and serves to lock the second end of the torsion bar. The first end of the torsion bar is locked to the spool, through the torsion bar cam, and then is subjected to a torque in the webbing extraction direction resulting from the force of the occupant being decelerated into the webbing. The torsion bar thereby absorbs this torque, from the occupant, and is designed to deform elastically and plastically at a predetermined torque to manage the energy from the occupant to mitigate the resultant force being transmitted back into the occupant. This mitigation of the force on the occupant through the torsion bar improves safety.

Figure 1:
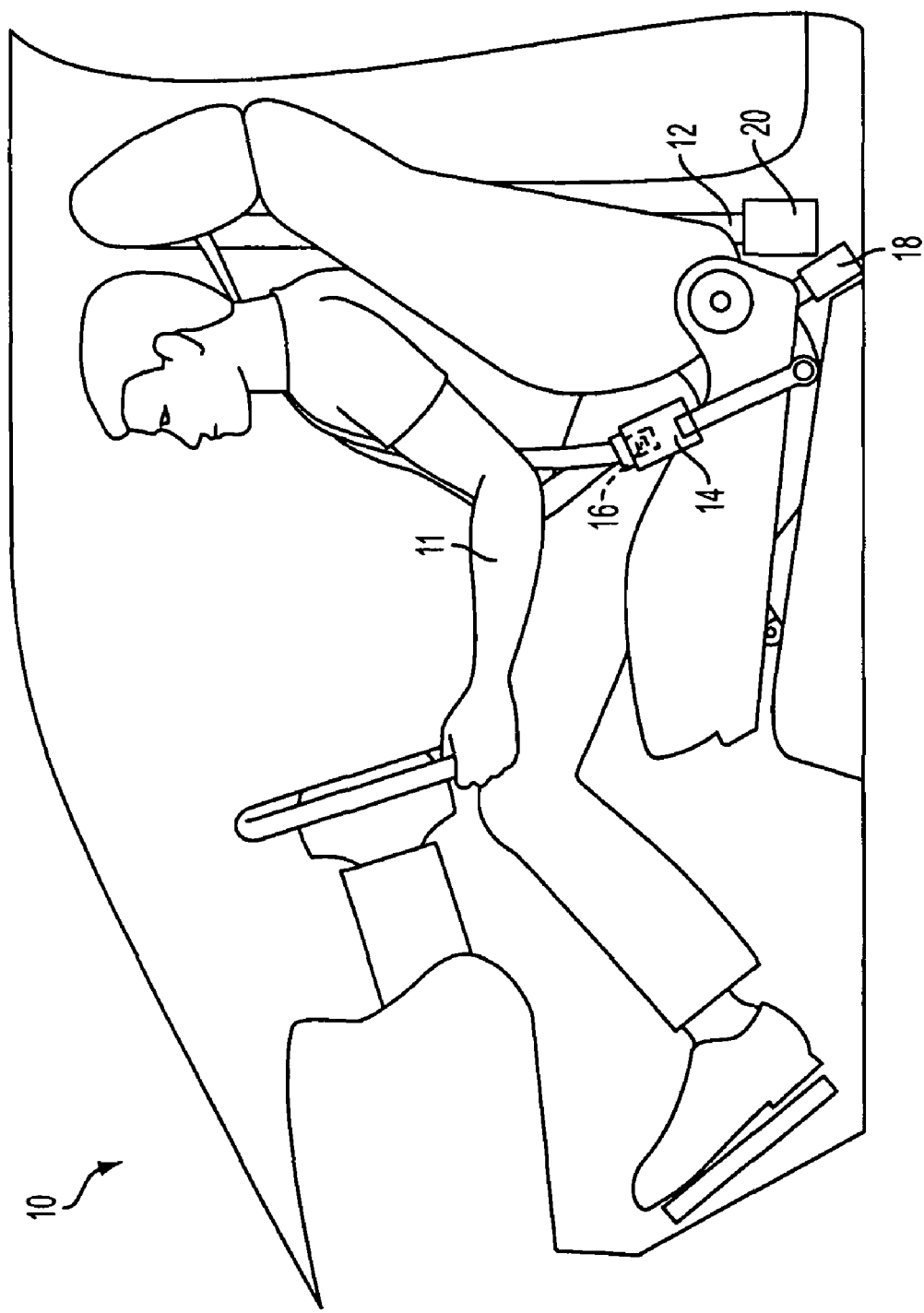
FIG. 1 is a side view of a vehicle showing a seat belt system including a retractor according to an exemplary embodiment.
Figure 2:
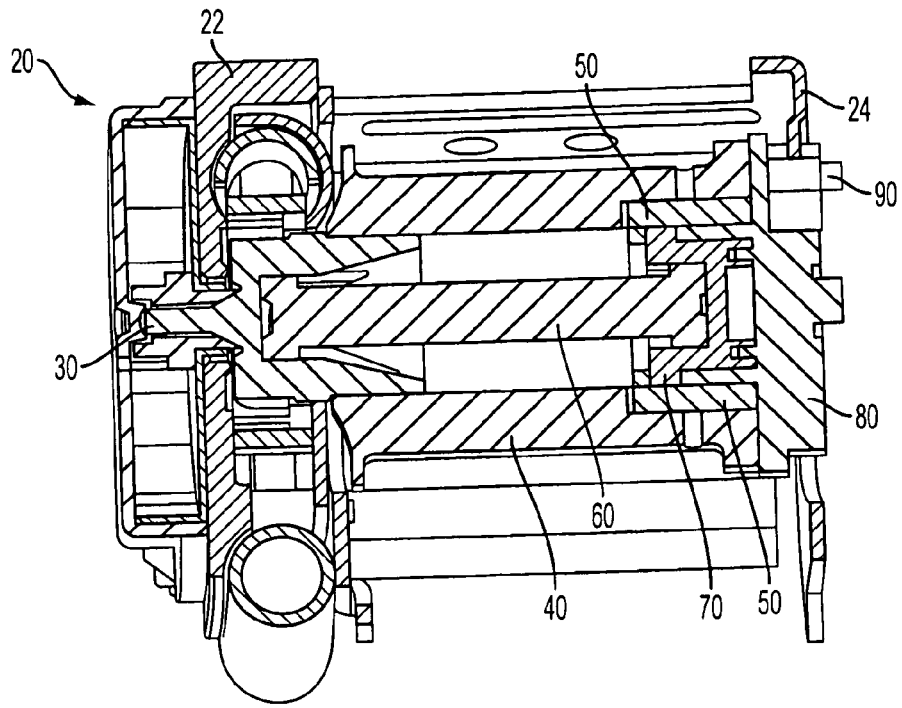
FIG. 2 is a section view of an exemplary embodiment of a retractor with pretensioned spool, for use within a vehicle.
Figure 3:
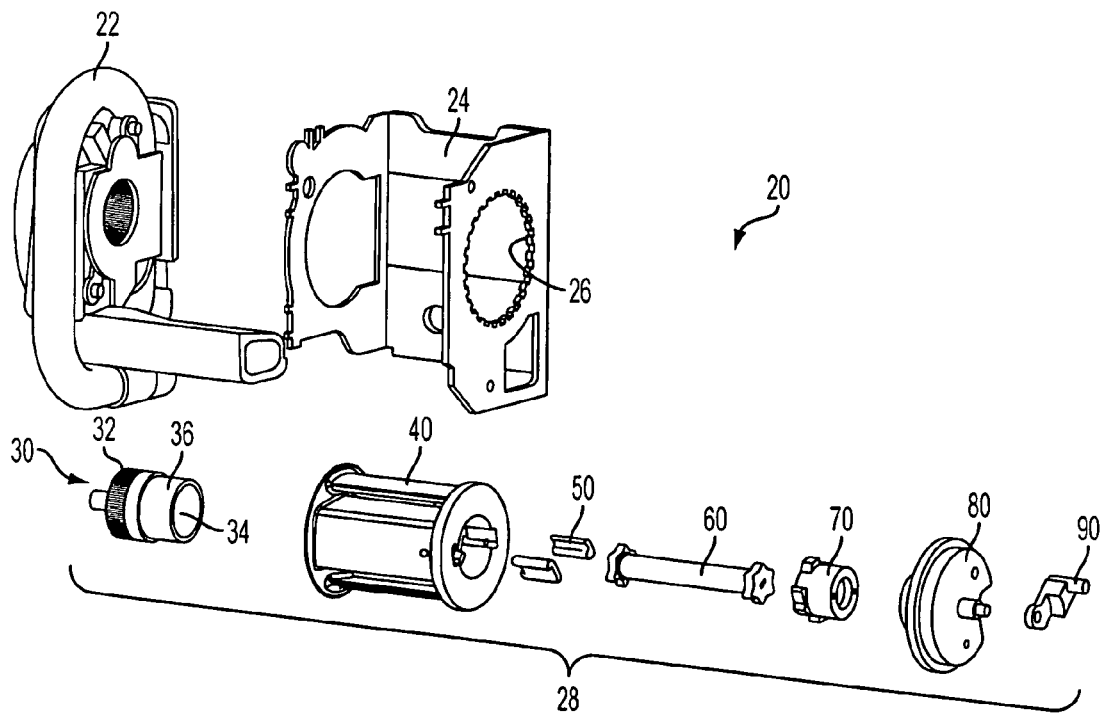
FIG. 3 is an exploded view of the retractor of FIG. 2.
Figure 4:
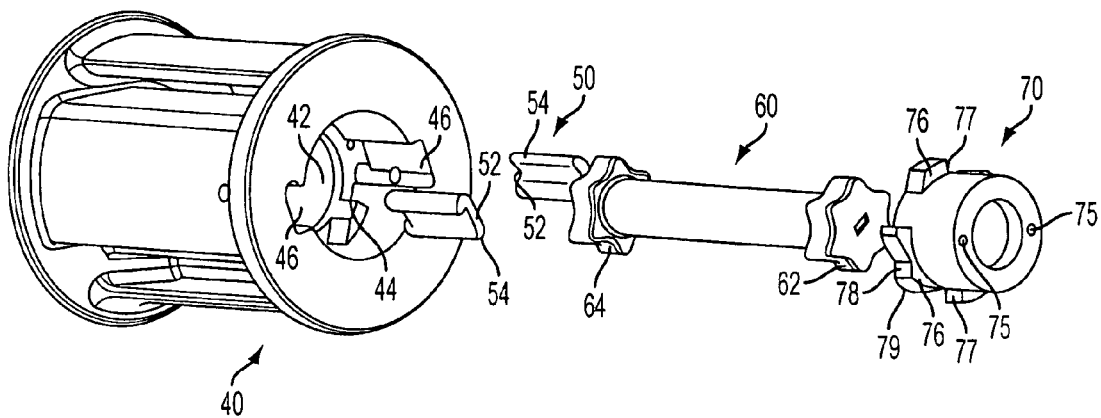
FIG. 4 is an exploded view of a portion of the retractor of FIG. 2.

Referring to FIG. 1, a seat belt system 10 is shown according to an exemplary embodiment. The seat belt system 10 is used within a vehicle to help restrain the movement of an occupant 11 during a sudden acceleration, typically resulting from a dynamic impact event of the vehicle. The term acceleration refers to the absolute value of the acceleration that the vehicle experiences, whether negative (e.g., deceleration) or positive. The seat belt system 10 includes a webbing or belt 12, a buckle 14, a tongue member 16 to engage the buckle 14, an anchor member 18, and a retractor 20. During a dynamic impact event of the vehicle, the retractor 20 locks the webbing from extracting or unwinding, which restricts movement of the occupant. The seat belt system 10 includes one or more sensors (not shown) configured to detect a sudden acceleration of the vehicle. The sensor(s) is configured to send a signal to a controller (not shown) for the retractor 20 to activate the retractor 20 as appropriate depending on whether the sensor detects a low or high acceleration event.

Figure 5:
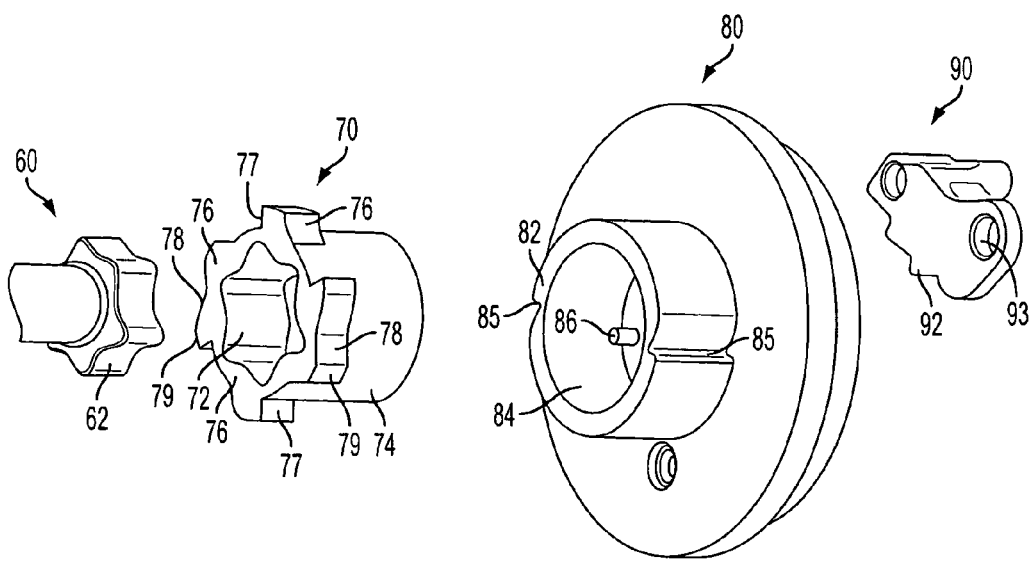
FIG. 5 is an exploded view of a portion of the retractor of FIG. 2.
Figure 6:
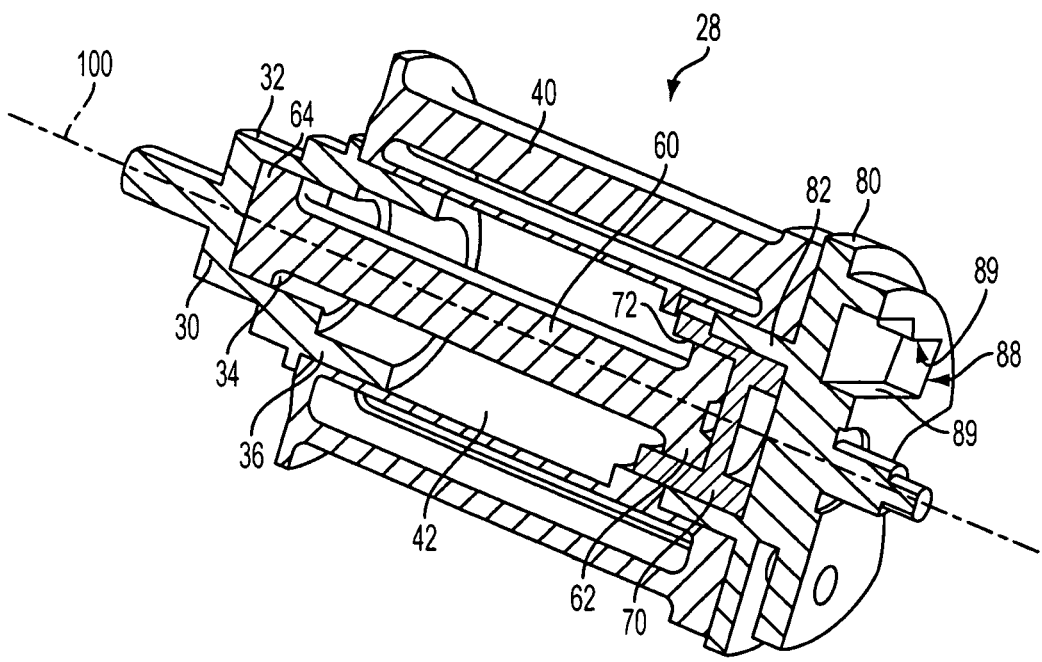
FIG. 6 is a perspective view of the spool assembly for use within the retractor of FIG. 2.

Referring to FIGS. 2-6, a retractor 20 is shown that includes a pretensioner 22, a frame 24, and a spool assembly 28. The spool assembly 28 comprises a pinion 30, a spool 40, at least one coupler pawl 50, a torsion bar 60, a torsion bar cam 70, a lock base 80, and a lock pawl 90. The pinion 30, torsion bar 60, torsion bar cam 70, locking base 80, and spool 40 share a substantially common pivot axis 100 (FIG. 6). This pivot axis 100 is about which the webbing 12 of the seat belt system 10 may be extracted or retracted. The pretensioner 22 may be constructed according to known methods, and includes a coupling member to drive rotational motion into the pinion 30 during pretensioner deployment. The pretensioner 22 is also non-reversible, so that once the pretensioner 22 deploys to retract the webbing 12 of the seat belt system 10, the pretensioner 22 may not be rotated in the webbing extracting direction D1 (see FIG. 8).

The pinion 30 may be made from steel or any other material strong enough to transmit the high torque generated by the pretensioner 22 and may be made by conventional methods (e.g., forging, broaching, machining). The pinion 30 includes a first and a second end, whereby the first end may be pivotally coupled to the pretensioner 22 by a tooth mesh 32, which transfers the torque generated by the pretensioner 22 during deployment into the pinion 30. The second end of the pinion, having a female key-way 34, may be pivotally coupled to the second end of the torsion bar 60, having a male key-way 64. The key-way 34 may be any shape (e.g., star shape, polygon) that transmits the predetermined torque. The second end of the pinion 60 may also include a bearing surface 36 on its outer diameter that may couple to the inner surface 42 of the second end of the spool to provide substantial concentricity between the pinion 30, torsion bar 60 and spool 40, for smooth rotation of the spool assembly. The construction of the pinion 30 is not limited to that disclosed above, and may be constructed from any geometry which transmits the required torque to another member. For example, according to other embodiments, the second end of the pinion 30 may have a male key-way that may be pivotally coupled to the second end of the torsion bar 60, having a female key-way or other useful shape to transmit torque.

The torsion bar 60 may be made from steel or other material strong enough to transmit the high torque generated by the pretensioner 22 and may be made through conventional methods (e.g., forging, broaching, machining). The torsion bar 60 includes a first and a second end, whereby the first end, having a male key-way 62, may be pivotally coupled to first end of the torsion bar cam 70, having a female key-way 72. The second end of the torsion bar 60, having a male key way 64, may be coupled to the second end of the pinion 30, having a female key-way 34. The torsion bar 60 is pivotally coupled at both ends to transfer and to absorb a predetermined torque, which provides energy management through first elastic deformation, then by plastic deformation, as it yields under the torque generated by the extracting belt force resulting from the force of the occupant being decelerated during a vehicle impact event. The construction of the torsion bar 60 is not limited to that disclosed above, and may be constructed from any geometry which transmits the required torque to another member. For example, according to other embodiments, the first end of the torsion bar 60 may have a female key-way that may be pivotally coupled to the first end of the torsion bar cam 70, having a male key-way or other useful shape to transmit torque.

The torsion bar cam 70 may be made from steel or other material (e.g., zinc) strong enough to transmit the high torque transferred through the torsion bar 60 from the pretensioner 22 and may be made through conventional methods (e.g., cast, forged then broached, machined). The torsion bar cam 70 includes a first and a second end, whereby the first end having a female key-way 72, may be pivotally coupled to the first end of the torsion bar 60, having a male key-way 62. The second end of the torsion bar cam 70 may include a bearing surface 74 on its outer diameter, which contacts the inner bearing surface 84 of the first end of the lock base 80, and may further include at least one shear pin hole 75, to interface with a shear pin 86 of the lock base 80. The shear pin(s) 86 are constructed to shear at a low torque, thereby allowing relative rotation between the torsion bar cam 70 and the lock base 80 during pretensioner 22 deployment. Additionally, the torsion bar cam 70 includes a plurality of protrusions 76, which may extend outwards in the radial direction from the bearing surface 74 of the first end. Each protrusion 76 may be constructed to begin flush with the leading edge of the first end of the torsion bar cam 70, or it may be positioned between its first and second ends of the torsion bar cam 70. Each protrusion 76 may include a contact surface 77, which during pretensioner deployment is rotated into contact with a mating contact surface 44 on the spool 40, thereby transferring torque through the contact surfaces 77 and 44. The torsion bar cam 70 also includes at least one protrusion 76 containing a cam face 78, and according to the exemplary embodiment shown contains two cam faces 78, each provided to rotate one coupler pawl 50.

According to the exemplary embodiment shown, torque input into the torsion bar cam 70, as generated by deployment of the pretensioner 22, shears the shear pin(s) 86 from the lock base 80, allowing counter-clockwise rotation (webbing retraction direction D1), as shown in FIG. 5, of the torsion bar cam 70 until the contact surfaces 77 touch the contact surfaces 44 of the spool 40. During this counter-clockwise rotation, the cam faces 78 of the torsion bar cam 70 drive the coupler pawls 50 outward in a radial direction, such that the contact surfaces 54 of the coupler pawls 50 may disengage from the mating contact surfaces 85 of the lock base 80. The disengagement of the coupler pawls 50 allows the spool 40 to move independently of the lock base 80 when the pretensioner 22 is fired, and creates a smooth and controlled energy management by carrying the load through the torsion bar 60.

The lock base 80 may be made from steel or other material (e.g., zinc) strong enough to transmit the torque transferred through the lock base 80 during low acceleration events, where the pretensioner 22 does not fire, and may be made through conventional methods (e.g., cast, cold forged, machined). The lock base 80 includes a first and a second end, whereby the first end further includes a protruded section 82, having an inner bearing surface 84 and also having contact surfaces 85, which contact the coupler pawls 50 to prevent rotation of the spool 40 in the webbing extraction direction D1 during low acceleration events. The first end of the lock base 80 includes the at least one shear pin 86, which is designed to shear at a predetermined torque to allow rotation of the torsion bar cam 70 relative to the lock base 80 during a high acceleration event in which the pretensioner 22 is fired. The second end includes a pivot surface 88 for the locking pawl 90 to attach and pivot about, and further includes guide surfaces 89 which the locking pawl 90 rotates within (FIG. 6).

Figure 17:
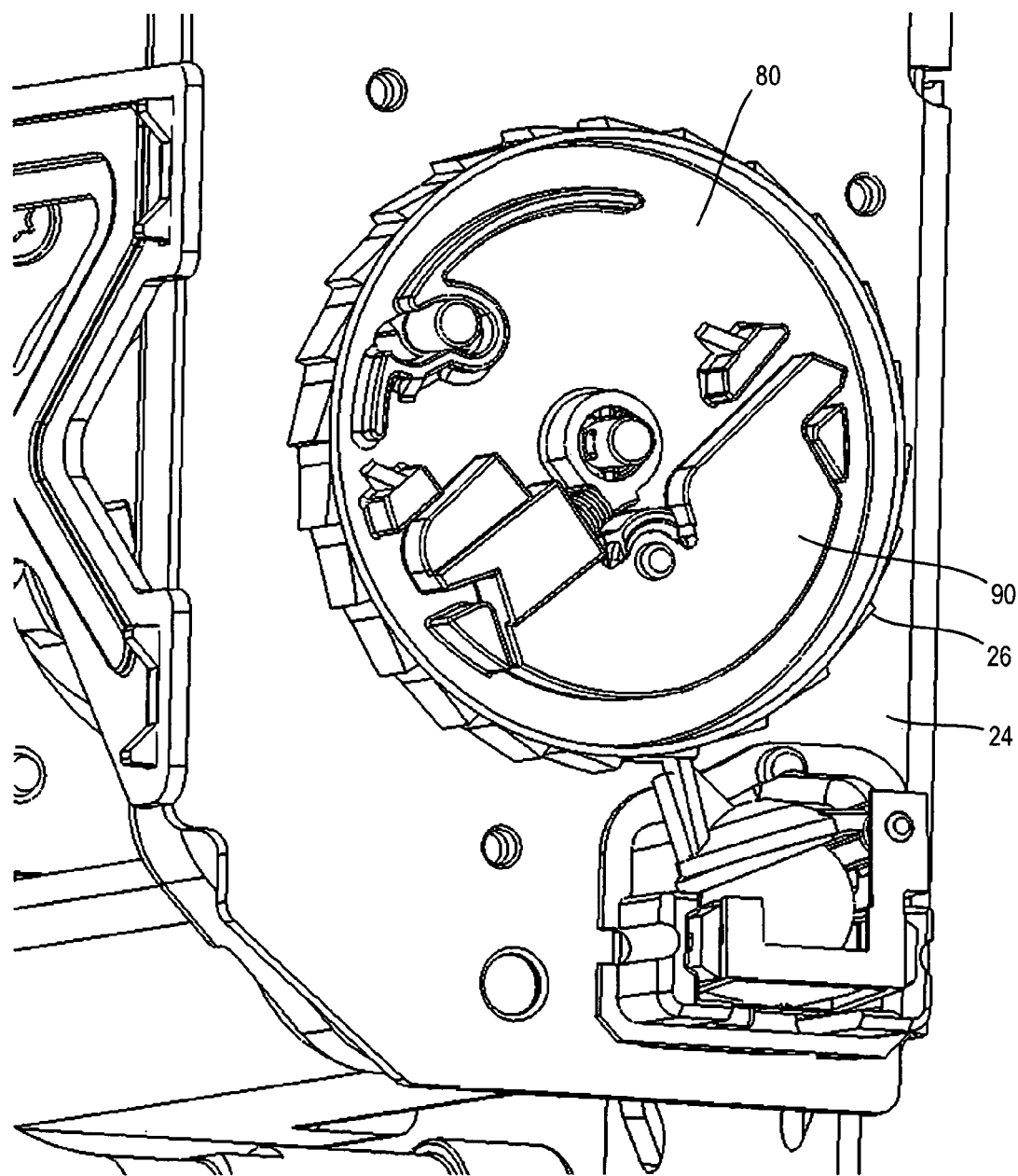
FIG. 17 is an illustration of a mechanism that causes a lock base pawl to engage a frame due to vehicle acceleration.

The lock or locking pawl 90 may be made from steel or other material (e.g., zinc) strong enough to transmit the torque transferred through the locking pawl 90 from low acceleration events and may be made through conventional methods (e.g., cast, forged then broached, machined). The locking pawl 90 comprises a pivot 93 that pivotally couples the locking pawl to the lock base 80. The locking pawl further includes teeth 92 formed on the exterior to engage the teeth 26 of the frame 24 during low acceleration events to prevent extraction of the webbing of the seat belt system 10. When the teeth 92 of the locking pawl 90 engage the teeth 26 of the frame 24, rotation of the lock base 80 in the webbing extraction direction D1 is prohibited, thus prohibiting rotation of the spool 40 in the webbing extraction direction D1. According to another embodiment, the locking pawl 90 may be pivotally coupled to the frame 24, having teeth formed on the end opposite to the pivot that may engage teeth on the lock base during low acceleration events to prevent extraction of the webbing 12 of the seat belt system 10. When the teeth of the locking pawl 90 engage the teeth of the lock base 80, rotation of the lock base 80 in the webbing extraction direction D1 is prohibited, which, in turn, prohibits rotation of the spool 40 in the webbing extraction direction D1. The locking pawl 90 rotates to engage or disengage the teeth 92 with the teeth 26 of the frame 24 based upon information received by an acceleration sensor. The locking pawl 90 moves due to vehicle acceleration. FIG. 17 also illustrates the movement of the locking pawl 90 to engage the frame 24.

Figure 7:
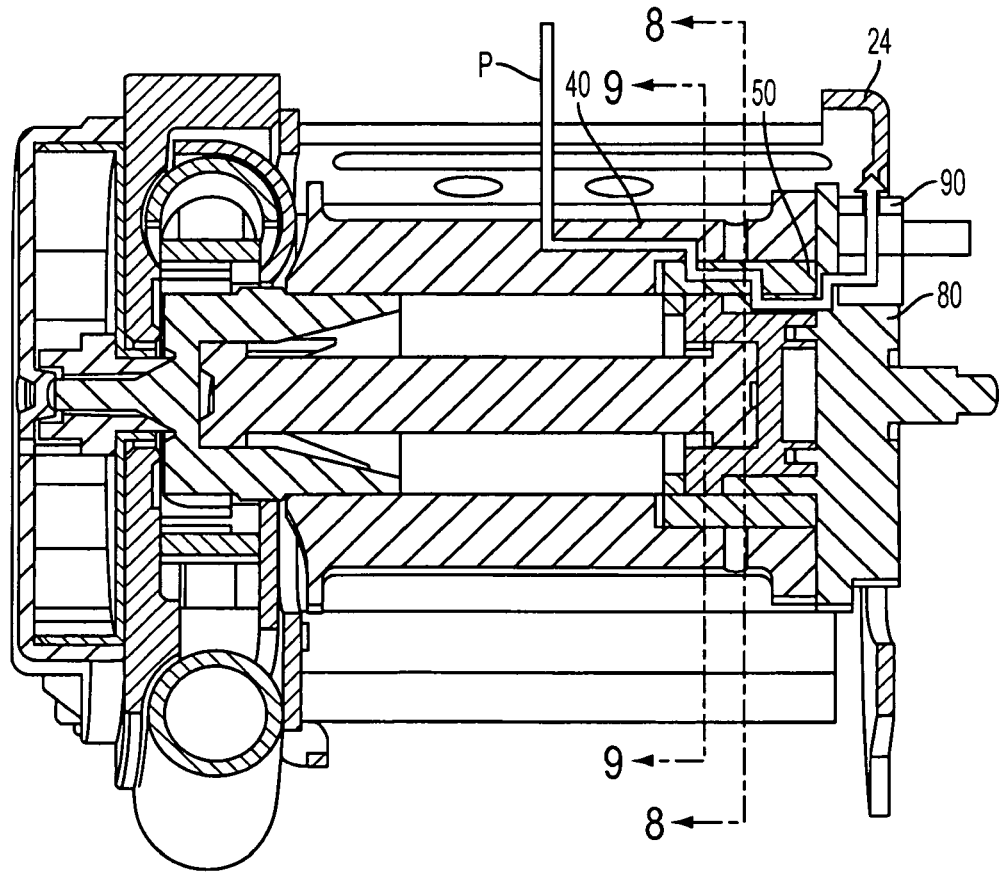
FIG. 7 is a perspective section view of a retractor with pretensioned spool illustrating the load path when the pretensioner does not fire.
Figure 8:
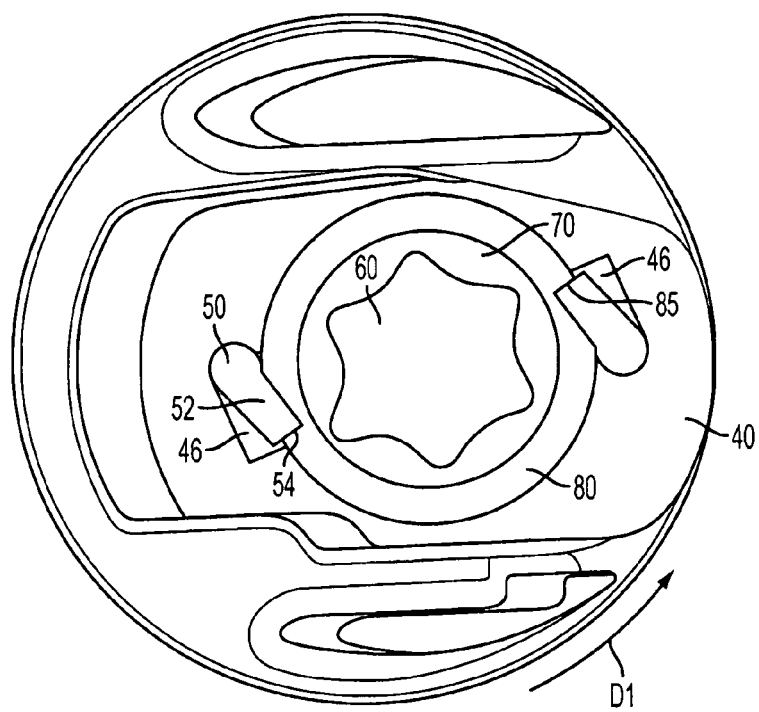
FIG. 8 is a perspective section view, taken along line 8-8 of FIG. 7, illustrating the coupler pawls engaged between the spool and the lock base.
Figure 9:
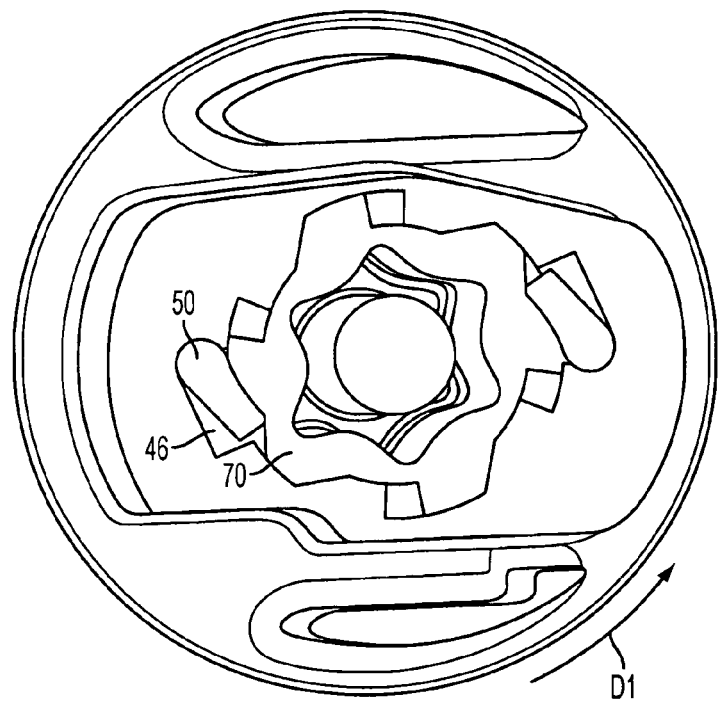
FIG. 9 is a perspective section view, taken along line 9-9 of FIG. 7, illustrating the torsion bar cam allowing the coupler pawls to engage the spool.

Referring to FIGS. 7-9, a retractor 10 having a pretensioned spool 40 is shown. The load path P taken by forces exerted on the seat belt webbing 12 by an occupant 11 during a low acceleration impact whereby the pretensioner 22 is not fired is illustrated. This load path P follows from the belt 12, into the spool 40, into the coupler pawls 50, into the lock base 80, into the lock pawl 90, then into the frame 24. The webbing 12 is fixed to the spool 40, and then wound around the spool 40 as the spool rotates about its pivot axis. The load is transferred from the spool 40 through the coupler pawls 50 and into the lock base 80, as shown in FIG. 8. The spool 40 comprises cavities 46 to house each coupler pawl 50, whereby the coupler pawl 50 may pivot so that the nose 52 of the coupler pawl 50 leaves the cavity 46 so that the contact surface 54 of the coupler pawl 50 engages the contact surface 85 of the lock base 80, as shown in FIG. 8. A force (e.g., spring, inertia, etc.) may bias the coupler pawls 50 out of the cavities 46 to engage or load the lock base 80. The lock base 80 is prevented from rotating in the spool extracting direction D1, because the lock base 80 is held fixed by the lock pawl 90. The lock pawl 90 may have teeth 92 that extend outward in the radial direction to engage teeth 26 of the frame 24. The frame teeth 26 are fixed and thereby the lock pawl 90 is fixed through the engagement of teeth 92 with teeth 26, which in turn fixes the lock base 80. Therefore, during low acceleration impacts, in which the pretensioner 22 does not fire, the webbing 12 of the seat belt assembly 10 is prevented from extracting, which limits the movement of the occupant 11 being restrained. Under conditions in which the pretensioner 22 does not fire (such as a low acceleration impact), the torsion bar cam 70 does not rotate, thereby allowing the coupler pawls 50 to remain in the engaged position with the lock base 80, as shown in FIG. 9.

Figure 10:
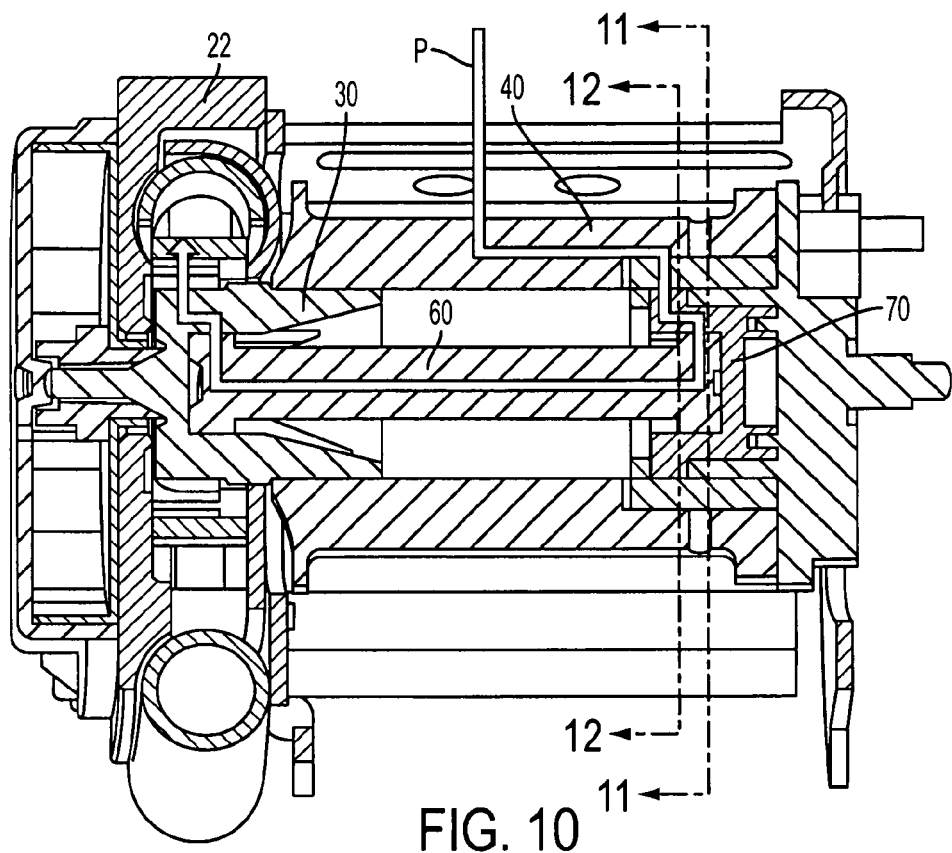
FIG. 10 is a perspective section view of a retractor with pretensioned spool illustrating the load path when the pretensioner does fire.
Figure 11:
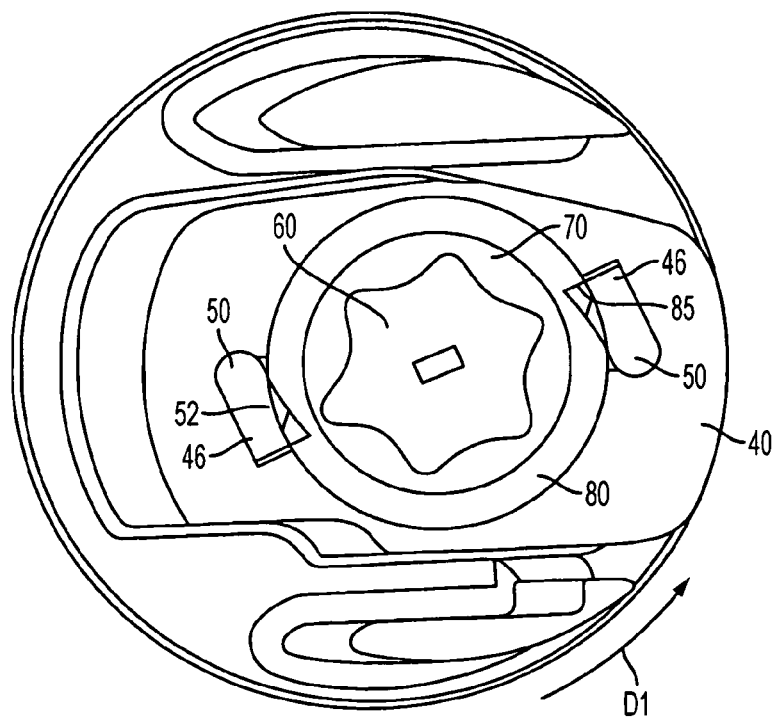
FIG. 11 is a perspective section view, taken along line 11-11 of FIG. 10, illustrating the coupler pawls disengaged from the lock base.
Figure 12:
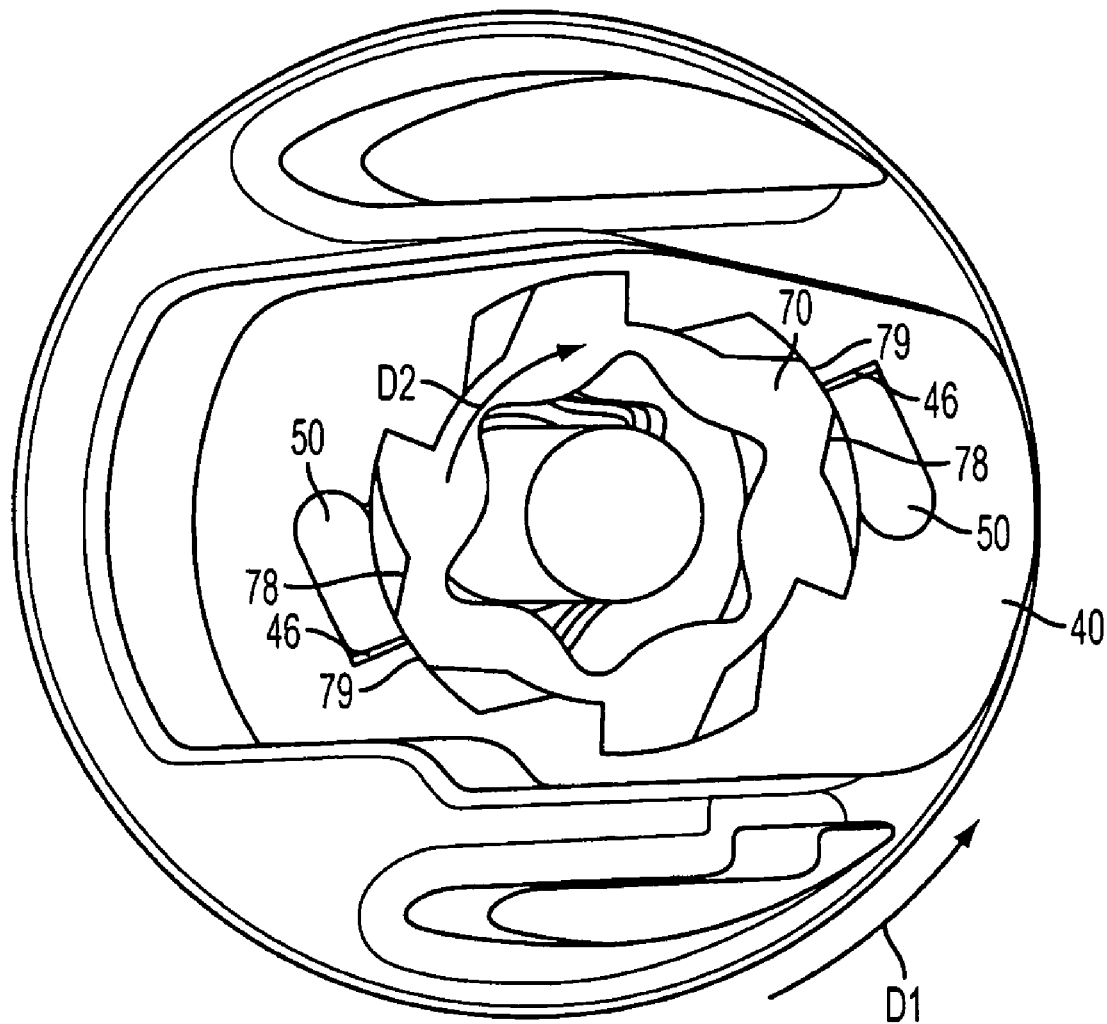
FIG. 12 is a perspective section view, taken along line 12-12 of FIG. 11, illustrating the torsion bar cam contacting the spool.

FIGS. 10-12 illustrate a retractor 20 having a pretensioned spool 40, showing the load path P taken by forces exerted on the seat belt webbing 12 by an occupant 11, during a high acceleration impact whereby the pretensioner 22 is fired. This load path P follows from the belt 12, into the spool 40, into the torsion bar cam 70, into the torsion bar 60, into the pinion 30, then into the pretensioner 22. The webbing 12 is fixed to the spool 40, and then wound around the spool 40 as the spool 40 rotates about the pivot axis 100. The load is transferred from the spool 40 directly into the torsion bar cam 70 through the contact surfaces 44 and 77, as shown in FIG. 12. The torque generated by the pretensioner 22 rotates the pinion 30 in a direction D2 opposite to the extracting direction D1 (e.g. clockwise direction, relative to FIG. 12) which in turn rotates the torsion bar in a direction opposite to the extracting direction D1. This torque between the torsion bar 60 and torsion bar cam 70 shears the shear pin(s) 86 from the lock base 80, allowing rotation of the torsion bar cam 70 with respect to the lock base 80, until the contact surfaces 77 of the torsion bar cam 70 contact the contact surfaces 44 of the spool (this condition is illustrated in FIG. 12). This torque then induces rotation of the spool 40 in a direction to retract the belt (opposite to the extracting direction D1), which removes slack between the belt 12 and occupant 11, thereby mitigating the initial allowable deflection or movement of the occupant 11 during a high acceleration event. After the initial deployment of the pretensioner 22, the force generated by the decelerating occupant 11 imparts a force on the webbing 12 of the seat belt system 10 in the spool extracting direction D1. This force generates a torque transferred from the spool 40, through the torsion bar cam 70, and into the torsion bar 60. The second end of the torsion bar 60 is held fixed by the pinion 30 (e.g., through the engagement of key-ways 34 and 64), which is held fixed by the pretensioner 22, since the pretensioner 22 is non-reversible. The first end of the torsion bar 60 may rotate, with respect to its fixed second end, at a predetermined torque, from elastic deformation and then from plastic deformation, after yielding, of the torsion bar 60. This deformation allows the spool 40 to rotate along with the torsion bar cam 70, thus allowing for the webbing 12 to extract a certain amount and mitigate the forces exerted on the occupant 11 during the acceleration event. This mitigation of forces exerted on the occupant 11 provides a smooth energy management method and improves safety to the occupant 11.

Also referring to FIGS. 11 and 12, the rotation of the torsion bar cam 70, in the clockwise direction D2, drives the coupler pawls 50 into the cavities 46 and out of engagement with the lock base 80. Each coupler pawl 50 may be driven by a mating cam face 78 on the torsion bar cam 70, which acts like a ramp whereby the pawl 50 rides up the ramp until the cam 78 runs out of surface, which corresponds to the pawl 50 being contained within the cavity 46 of the spool 40. The torsion bar cam 70 also includes a flat surface 79 after the cam surface 78 to hold the pawl 50 in the cavity 46 during loading between the spool 40 and the torsion bar cam 70. With the pawls 50 disengaged from the lock base 80 and with the torsion bar cam 70 contacting the spool 40, the spool 40 may rotate in the webbing extracting direction D1, as the torsion bar 60 deforms. This configuration improves occupant safety by providing a smooth energy management method by loading directly through the torsion bar 60 without the effects from the lock pawl 90 and lock base 80.

Figure 13:
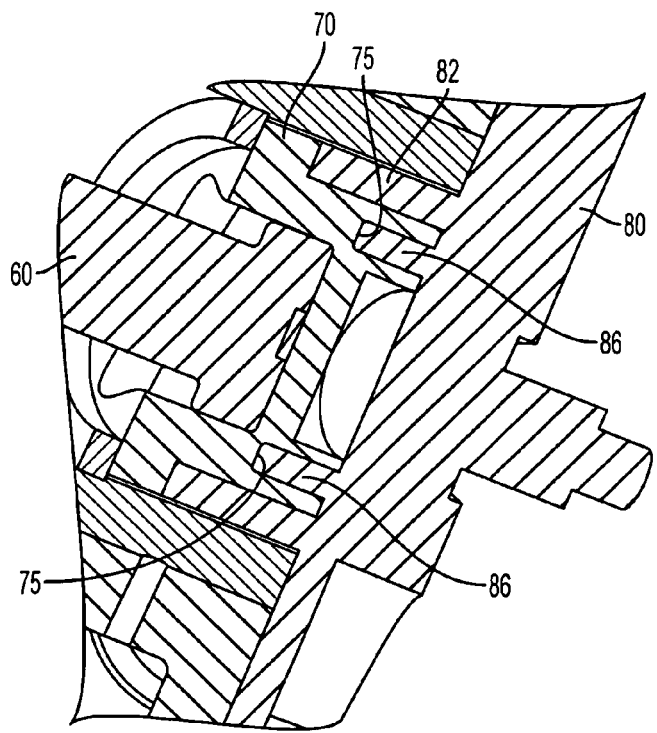
FIG. 13 is a perspective section view illustrating the shear pins of the lock base, which engage the torsion bar cam, prior to shearing.

Referring to FIG. 13, shear pins 86 of the lock base 80 are shown, according to an exemplary embodiment, engaging the shear pin holes 75 in the torsion bar cam 70. Shear pins 86 of the lock base 80 serve two primary purposes. First, the shear pins 86 improve manufacturability and aid functionality by providing a method of assembly which ensures correct orientation of the torsion bar cam 70 within the retractor 20, such that the each cam face 78 of the torsion bar cam 70 is in position to contact and rotate a corresponding coupler pawl 50 out of engagement with the lock base 80 when the pretensioner 22 fires. Second, the shear pins 86 substantially eliminate relative motion between the torsion bar cam 70 and the lock base 80, prior to the pretensioner 22 firing, which mitigates the potential for noise, which may be perceived by end users or customers as unwanted and annoying. Shear pins 86 of the lock base 80 are designed to shear at a predetermined torque lower than that which the torsion bar cam 70 is subjected to when the pretensioner 22 fires.

Figure 14:
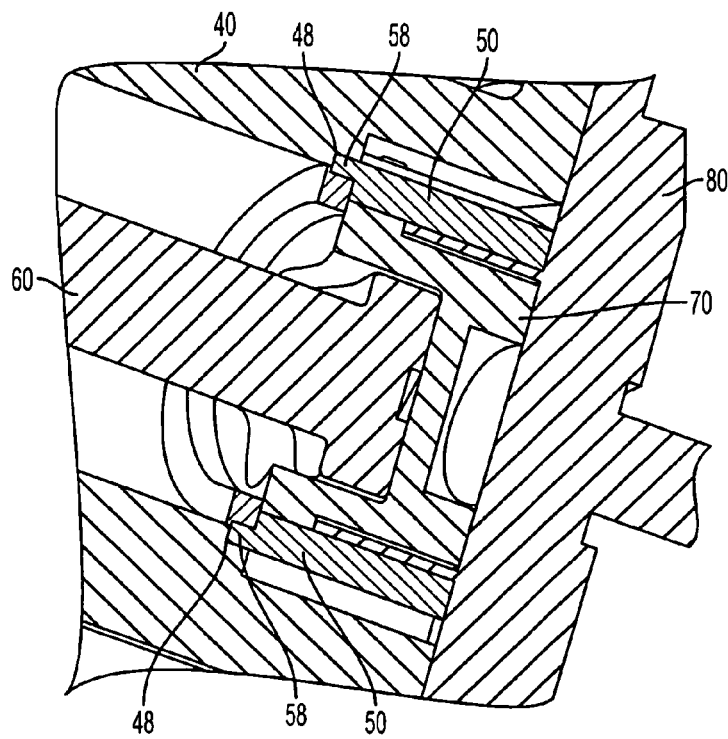
FIG. 14 is a perspective section view illustrating the shear pin of each the coupler pawl, which engage the spool, prior to shearing.

Referring to FIG. 14, according to another exemplary embodiment, the coupler pawls 50 may comprise shear pins 58 that engage corresponding shear pin holes 48 in the spool 40. Shear pins 58 of the coupler pawls 50 serve two primarily purposes. First, the shear pins 58 improve manufacturability by providing a positive engagement feature between the coupler pawl 50 and spool 40, which holds the coupler pawl 50 in place properly during assembly of the retractor 20. Second, the shear pins 58 improve function, by having an axis of rotation about which the coupler pawl 50 rotates about when the torsion bar cam 70 drives the coupler pawl 50 out of engagement with the lock base 80. According to another embodiment, shear pins may protrude from the spool 40, engaging corresponding shear pins holes in the coupler pawls 50, having the size of each pin tailored to a predetermined shear stress.

Figure 15:
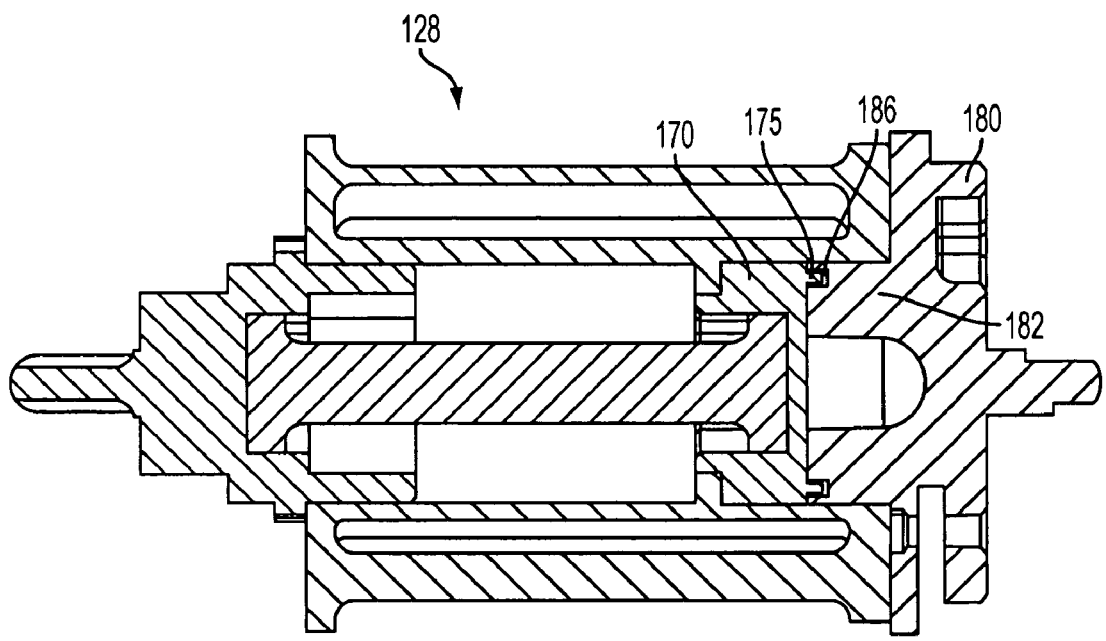
FIG. 15 is a cross-section view of a spool assembly for a retractor according to another exemplary embodiment taken through sheer pins extending from the torsion bar cam.
Figure 16:
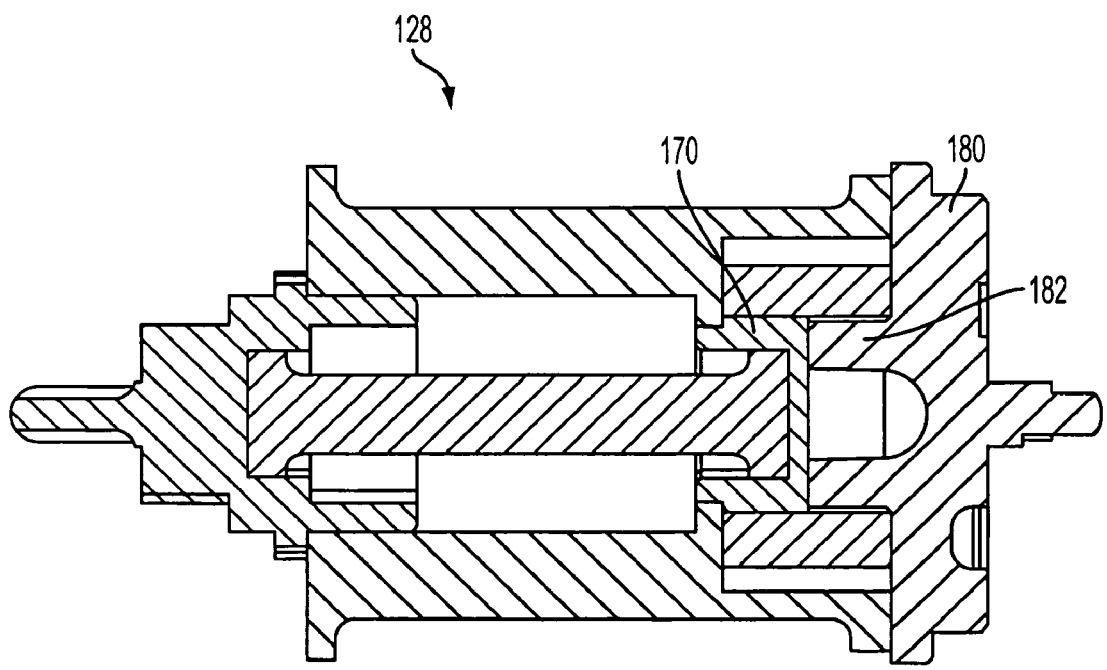
FIG. 16 is a cross-section view of the spool assembly of FIG. 15 taken through the coupler pawls.

Referring now to FIGS. 15 and 16, cross-sections of a spool assembly 128 are shown according to another exemplary embodiment. The spool assembly 128 is similar to spool assembly 28 in function, but comprises a lock base 180 with a protruded section 182 that is a solid boss, rather than a generally cylindrical wall (i.e., protruded section 82 of lock base 80, shown in FIG. 4). The torsion bar cam 170, therefore, lies against the surface of the protruded section 182 rather than being at least partially surrounded by protruded section 182. The torsion bar cam 170 comprises one or more shear pins 175 that protrude from the second end of the torsion bar cam 170 and engage corresponding shear pin holes 186 formed in the lock base 180. The shear pins 175 and shear pin holes 186 are analogous in function to the shear pins 86 and shear pin holes 75 of the previously described embodiment, having the a size that is tailored so that the shear pins 175 shear at a predetermined shear stress (e.g., a predetermined torque lower than that which the torsion bar cam 170 is subjected to when the pretensioner 22 fires).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the retractor with pretensioned spool as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A seatbelt retractor for a seat belt device in a vehicle, the retractor comprising:
    a frame;
    a spool configured to be fixed to one end of a webbing so that the webbing may be wound around the spool, the spool being rotatably mounted at both ends to the frame and configured to rotate in a webbing extraction direction and a webbing retraction direction;
    a torsion bar positioned in the spool, a first end of the torsion bar being coupled to a torsion bar cam and a second end of the torsion bar being connected to a pinion, wherein the torsion bar cam is configured to engage the spool;
    a pretensioner coupled to the second end of the torsion bar via the pinion, the pretensioner configured to rotate the pinion in a webbing retraction direction when the pretensioner activates in response to an acceleration of the vehicle greater than a predetermined high acceleration; and
    at least one coupler pawl positioned in a cavity in the spool and connecting the spool to a locking mechanism to prevent rotation of the spool in response to an acceleration of the vehicle greater than a low acceleration, but less than the predetermined high acceleration, wherein the locking mechanism is configured to prevent rotation of the spool,
    wherein the at least one coupler pawl is configured to pivot so that when the vehicle acceleration exceeds the predetermined high acceleration and the pretensioner is activated, the spool is not connected to the locking mechanism thereby allowing the spool to rotate relative to the locking mechanism.

2. The seatbelt retractor of claim 1, wherein the pinion is configured to hold the torsion bar at the second end when the pretensioner fires, and wherein the first end of the torsion bar is configured to rotate relative to the second end and deform to absorb forces from the higher acceleration event.

3. The seatbelt retractor of claim 1, wherein the pretensioner is non-reversible such that after firing, the pretensioner is prevented from rotating in the webbing extraction direction and is configured to lock the second end of a torsion bar.

4. The seatbelt retractor of claim 1, wherein the pinion includes a first end and a second end, the first end being pivotally coupled to the pretensioner by a tooth mesh, and the second end being pivotally coupled to the second end of the torsion bar.

5. The seatbelt retractor of claim 4, wherein the second end of the pinion includes a female key-way configured to couple to a male key-way on the second end of the torsion bar.

6. The seatbelt retractor of claim 1, wherein the locking mechanism includes a lock base with shear pin.

7. The seatbelt retractor of claim 6, wherein the lock base shear pin is configured to engage a cavity on a second end of the torsion bar cam.

8. The seatbelt retractor of claim 7, wherein the lock base shear pin is configured to shear at a predetermined torque lower than a torque which the torsion bar cam is subjected to when the pretensioner is activated.

9. The seatbelt retractor of claim 7, wherein when the lock base shear pin shears off, the torsion bar cam is configured to rotate relative to the lock base until contact surface of the torsion bar cam contacts a contact surface of the spool.

10. The seatbelt retractor of claim 6, wherein the locking mechanism includes a lock pawl configured to pivot to engage teeth on the frame to prevent rotation of the lock base in the spool extracting direction.

11. The seatbelt retractor of claim 1, wherein the torsion bar cam is configured such that when the torsion bar cam rotates in a first direction, the torsion bar cam drives the at least one coupler pawl into the cavity in the spool and out of engagement with the lock base.

12. The seatbelt retractor of claim 11, wherein the torsion bar cam includes a cam surface and a flat surface, and wherein the at least one coupler pawl travels up the cam surface until being positioned in the cavity in the spool.

13. The seatbelt retractor of claim 12, wherein the flat surface is configured to hold the at least one coupler pawl in the cavity during loading between the spool and the torsion bar cam.

14. The seatbelt retractor of claim 1, wherein the torsion bar is configured such that the torsion bar cam rotates only when the pretensioner is activated.

15. The seatbelt retractor of claim 1, wherein the pinion, torsion bar, torsion bar cam, lock base, and spool have a substantially common rotational axis.

16. The seatbelt retractor of claim 1, wherein the locking mechanism includes a lock base and a locking pawl, wherein the spool includes a first end proximate a pretensioner and a second, opposite end, and wherein the locking mechanism is positioned proximate the second end of the spool opposite the pretensioner.

* * * * *